(12) United States Patent
Jones

(10) Patent No.: US 9,030,300 B2
(45) Date of Patent: May 12, 2015

(54) OPERATIONAL PARAMETERS BASED ON PROXIMITY

(71) Applicant: Trimble Navigation Limited, Sunnyvale, CA (US)

(72) Inventor: Edward Jones, Palo Alto, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 254 days.

(21) Appl. No.: 13/794,203

(22) Filed: Mar. 11, 2013

(65) Prior Publication Data

US 2014/0253294 A1 Sep. 11, 2014

(51) Int. Cl.
| | |
|---|---|
| *H04Q 5/22* | (2006.01) |
| *G08B 13/14* | (2006.01) |
| *G08C 19/12* | (2006.01) |
| *G08B 5/22* | (2006.01) |
| *G05B 23/02* | (2006.01) |
| *G06K 7/00* | (2006.01) |
| *G06K 7/10* | (2006.01) |

(52) U.S. Cl.
CPC .................. *G06K 7/10217* (2013.01)

(58) Field of Classification Search
CPC ..... G06Q 10/087; G06Q 10/08; G08B 13/14; G08B 5/22; G06K 19/07; H04Q 5/22
See application file for complete search history.

(56) References Cited

U.S. PATENT DOCUMENTS

| | | | |
|---|---|---|---|
| 7,623,036 B2 * | 11/2009 | Onderko et al. ........... | 340/572.1 |
| 7,772,976 B2 | 8/2010 | Christopher | |
| 8,519,848 B2 * | 8/2013 | Stern ......................... | 340/572.1 |
| 8,674,810 B2 * | 3/2014 | Uysal et al. ................. | 340/10.4 |
| 8,681,001 B2 * | 3/2014 | Griesmann et al. ........ | 340/572.1 |
| 2005/0280508 A1 * | 12/2005 | Mravca et al. ............... | 340/10.2 |
| 2006/0197652 A1 * | 9/2006 | Hild et al. .................... | 340/10.2 |
| 2008/0084304 A1 * | 4/2008 | Yarvis ......................... | 340/572.1 |
| 2008/0143482 A1 * | 6/2008 | Shoarinejad et al. ........ | 340/10.1 |
| 2008/0165003 A1 * | 7/2008 | Graichen et al. ........... | 340/572.1 |
| 2010/0109844 A1 | 5/2010 | Carrick et al. | |
| 2010/0152811 A1 * | 6/2010 | Flaherty ........................ | 607/50 |
| 2011/0043373 A1 | 2/2011 | Best et al. | |
| 2011/0186290 A1 * | 8/2011 | Roddy et al. ................ | 166/253.1 |
| 2012/0175289 A1 * | 7/2012 | Bystron et al. .................. | 210/91 |
| 2013/0049925 A1 * | 2/2013 | Subramanian ................. | 340/3.1 |
| 2014/0084060 A1 * | 3/2014 | Jain et al. ....................... | 235/385 |

* cited by examiner

*Primary Examiner* — Jennifer Mehmood
*Assistant Examiner* — John Mortell
(74) *Attorney, Agent, or Firm* — Kilpatrick Townsend & Stockton LLP

(57) ABSTRACT

A method is disclosed for controlling operational parameters of a wireless reader device and/or one or more other devices based on proximity of the wireless reader device to a wireless electronic circuit. At a first location, the wireless reader device and/or the one or more other devices are controlled based on a first operational parameter. At a second location, interrogation signals are transmitted from the wireless reader device, and response signals are received at the wireless reader device. The response signals are transmitted from the wireless electronic circuit in response to receiving the interrogation signals from the wireless reader device. The response signals convey a control parameter to the wireless reader device that is associated with a second operational parameter. Thereafter, the wireless reader device and/or the one or more other devices are controlled based on the second operational parameter.

35 Claims, 11 Drawing Sheets

OPERATIONAL PARAMETERS BASED ON PROXIMITY

TECHNICAL FIELD

Embodiments of the present invention relate generally to operational parameters based on proximity and, more particularly, to operational parameters based on proximity of a wireless reader device to one or more wireless electronic circuits.

BACKGROUND

Wireless technologies exist that allow exchange of data over short distances. Examples include radio-frequency identification (RFID), Bluetooth, WiFi, and the like. Using these technologies, data can be gathered using a wireless reader device (e.g., an RFID reader) that communicates with wireless electronic circuits (e.g., RFID tag circuits). The wireless reader device typically transmits interrogation signals, and the wireless electronic circuits that receive the interrogation signals respond by transmitting response signals carrying the data. Systems using wireless reader devices and wireless electronic circuits are commonly utilized for identification and tracking purposes.

While these technologies provide established methods for exchanging data over short distances, improvements are constantly sought that allow extensions of these technologies into new areas.

SUMMARY

Some embodiments of the present invention provide control of operational parameters of a wireless reader device based on proximity of the wireless reader device to one or more wireless electronic circuits. The operational parameters may be used by the wireless reader device to control operations such as an interrogation rate, a reporting rate, a report type, a transmission power, an encryption level, and/or the like. The operational parameters and associated operations may be controlled based on proximity of the wireless reader device to the one or more wireless electronic circuits.

Other embodiments of the present invention provide control of operational parameters of one or more other devices (e.g., sensors or imaging devices) based on proximity of a wireless reader device to one or more electronic circuits. The operational parameters may be used by the one or more other devices to control operations such as a sampling rate, a sample type, a reporting rate, a report type, and/or the like. The operational parameters and associated operations may be controlled based on proximity of the wireless reader device to the one or more wireless electronic circuits.

Yet other embodiments of the present invention provide control of operational parameters of both a wireless reader device and one or more other devices based on proximity of the wireless reader device to one or more electronic circuits.

By way of example, in accordance with an embodiment of the invention, a method for controlling an interrogation rate of an RFID reader based on proximity of the RFID reader to an RFID tag circuit includes moving the RFID reader from a first location to a second location. At the first location the RFID tag circuit is outside an interrogation range of the RFID reader, and at the second location the RFID tag circuit is within the interrogation range of the RFID reader. At the first location, interrogation signals are transmitted from the RFID reader at a first interrogation rate. At the second location, the interrogation signals are transmitted from the RFID reader at the first interrogation rate, and response signals are received at the RFID reader. The response signals are transmitted from the RFID tag circuit in response to receiving the interrogation signals from the RFID reader. The response signals convey a control parameter to the RFID reader that indicates to the RFID reader to transmit the interrogation signals at a second interrogation rate that is different from the first interrogation rate. Thereafter, the interrogation signals are transmitted from the RFID reader at the second interrogation rate.

In some embodiments, the method also includes moving the RFID reader from the second location to a third location that is outside the interrogation range of the RFID reader. At the third location, the interrogation signals are transmitted from the RFID reader at the first interrogation rate. In other embodiments, the method also includes moving the RFID reader from the second location to a third location that is outside the interrogation range of the RFID reader. At the third location, the interrogation signals are transmitted from the RFID reader at the second interrogation rate.

In some embodiments, the first interrogation rate is slower than the second interrogation rate. In other embodiments, the first interrogation rate is faster than the second interrogation rate.

In some embodiments, the control parameter conveyed to the RFID reader indicates to the RFID reader that the RFID tag circuit is coupled to a stationary structure. In other embodiments, the control parameter conveyed to the RFID reader indicates to the RFID reader that the RFID tag circuit is coupled to a mobile object.

In accordance with another embodiment of the invention, a method is provided for controlling operational parameters of an RFID reader based on proximity of the RFID reader to an RFID tag circuit, where the RFID reader is at a first proximity to the RFID tag circuit while at a first location and at a second proximity to the RFID tag circuit while at a second location. At the first location interrogation signals are transmitted from the RFID reader based on a first operational parameter. At the second location, the interrogation signals are transmitted from the RFID reader based on the first operational parameter, and response signals are received at the RFID reader. The response signals are transmitted from the RFID tag circuit in response to receiving the interrogation signals from the RFID reader. The response signals convey a control parameter to the RFID reader that is associated with a second operational parameter different from the first operational parameter. Thereafter, the interrogation signals are transmitted from the RFID reader based on the second operational parameter.

In an embodiment, the RFID tag circuit is outside an interrogation range of the RFID reader at the first location, and the RFID tag circuit is within the interrogation range of the RFID reader at the second location.

In another embodiment, the RFID tag circuit is within an interrogation range of the RFID reader at the first location and at the second location. At the first location, the response signals are received at the RFID reader. The response signals are transmitted from the RFID tag circuit in response to receiving the interrogation signals from the RFID reader. The response signals convey the control parameter associated with the second operational parameter. At the first location, a signal strength of the response signals is determined to be less than a threshold signal level, so the interrogation signals continue to be transmitted from the RFID reader based on the first operational parameter. At the second location, the signal strength of the response signals is determined to be is greater than a threshold signal level, so the interrogation signals are transmitted from the RFID reader based on the second operational parameter.

In some embodiments, the first operational parameter is associated with a first interrogation rate of the RFID reader, and the second operational parameter is associated with a second interrogation rate of the RFID reader, where the first interrogation rate is different from the second interrogation rate. In other embodiments, the first operational parameter is associated with a first transmission power of the RFID reader, and the second operational parameter is associated with a second transmission power of the RFID reader, where the first transmission power is different from the second transmission power.

In another embodiment, at the first location reporting signals are transmitted from the RFID reader to a controller based on the first operational parameter. At the second location, the reporting signals are transmitted from the RFID reader to the controller based on the first operational parameter when the interrogation signals are transmitted from the RFID reader based on the first operational parameter, and the reporting signals are transmitted from the RFID reader to the controller based on the second operational parameter when the interrogation signals are transmitted from the RFID reader based on the second operational parameter.

In another embodiment, the control parameter includes location information associated with a location of the RFID tag circuit, and the second operational parameter is based on the location information.

In yet another embodiment, at the second location control signals are transmitted from the RFID reader to a controller, where the control signals convey the control parameter to the controller, and signals are received at the RFID reader from the controller. The signals are transmitted from the controller in response to receiving the control signals from the RFID reader. The signals convey the second operational parameter to the RFID reader. In some embodiments, the control parameter includes location information associated with a location of the RFID tag circuit, and the second operational parameter is based on the location information. In other embodiments, the control parameter includes location information associated with a location of the RFID reader, and the second operational parameter is based on the location information.

In accordance with another embodiment of the invention, a method is provided for controlling operational parameters of an RFID reader based on proximity of the RFID reader to an RFID tag circuit, where the RFID reader is at a first proximity to the RFID tag circuit while at a first location and at a second proximity to the RFID tag circuit while at a second location. At the first location, interrogation signals are transmitted from the RFID reader; and reporting signals are transmitted from the RFID reader to a controller based on a first operational parameter. At the second location, the interrogation signals are transmitted from the RFID reader, the reporting signals are transmitted from the RFID reader to the controller based on the first operational parameter, and response signals are received at the RFID reader. The response signals are transmitted from the RFID tag circuit in response to receiving the interrogation signals from the RFID reader. The response signals convey a control parameter to the RFID reader. The control parameter is associated with a second operational parameter that is different from the first operational parameter. Thereafter, the reporting signals are transmitted from the RFID reader to the controller based on the second operational parameter.

In some embodiments, the reporting signals convey location information associated with a location of the RFID reader. In other embodiments, the control parameter includes location information associated with a location of the RFID tag circuit, and the second operational parameter is based on the location information.

In some embodiments, the first operational parameter is associated with a first reporting rate of the RFID reader, and the second operational parameter is associated with a second reporting rate of the RFID reader, where the first reporting rate being different from the second reporting rate. In other embodiments, the first operational parameter is associated with a first encryption level for the reporting signals transmitted from the RFID reader, and the second operational parameter is associated with a second encryption level for the reporting signals transmitted from the RFID reader, where the first encryption level being different from the second encryption level.

In yet another embodiment, at the second location control signals are transmitted from the RFID reader to the controller, where the control signals convey the control parameter to the controller. Signals are received at the RFID reader from the controller, where the signals are transmitted from the controller in response to receiving the control signals from the RFID reader. The signals convey the second operational parameter to the RFID reader In accordance with yet another embodiment of the invention, a method is provided for controlling operational parameters of a sensor based on proximity of an RFID reader to an RFID tag circuit, where the RFID reader being at a first proximity to the RFID tag circuit while at a first location and at a second proximity to the RFID tag circuit while at a second location. At the first location, interrogation signals are transmitted from the RFID reader, and the sensor is controlled based on a first operational parameter. At the second location, the interrogation signals are transmitted from the RFID reader, the sensor is controlled based on the first operational parameter, and response signals are received at the RFID reader. The response signals are transmitted from the RFID tag circuit in response to receiving the interrogation signals from the RFID reader. The response signals convey a control parameter to the RFID reader that is associated with a second operational parameter different from the first operational parameter. Thereafter, the sensor is controlled based on the second operational parameter.

In some embodiments, controlling the sensor includes effecting any sensor capability or mode of operation. In other embodiments, controlling the sensor includes reporting an analysis performed by the sensor to a controller, and the first operational parameter and the second operational parameter determine rates at which the sensor is controlled.

In another embodiment, the sensor comprises an imaging device, and controlling the sensor includes capturing image data using the imaging device, and the first operational parameter and the second operational parameter determining rates at which the imaging device is controlled.

In some embodiments, the sensor is integrated with the RFID reader in a single handheld unit. In other embodiments, the sensor is located remote from the RFID reader, and control signals are transmitted from the RFID reader to the sensor, where the control signals convey the control parameter to the sensor.

In yet other embodiments, the sensor includes an RFID tag circuit configured as a wireless interface to receive the signals transmitted from the RFID reader.

These and other embodiments, along with many advantages and features, are described in detail below in conjunction with the drawings.

BRIEF DESCRIPTION OF THE DRAWINGS

In some of the drawings a sub-label is associated with a reference numeral to denote one of multiple similar components. When reference is made to a reference numeral without specifying a sub-label, it is intended to refer to all such similar components.

DETAILED DESCRIPTION

Embodiments of the present invention relate generally to determining operational parameters based on proximity of a wireless reader device to a wireless electronic circuit. As examples, some embodiments provide control of operational parameters of a wireless reader device based on proximity of the wireless reader device to one or more wireless electronic circuits. Other embodiments provide control of operational parameters of other devices (e.g., sensors or imaging devices) based on proximity of a wireless reader device to one or more wireless electronic circuits. Yet other embodiments provide control of operational parameters of both a wireless reader device and one or more other devices based on proximity of the wireless reader device to one or more wireless electronic circuits.

Proximity of the wireless reader device to the wireless electronic circuit may be determined using any of a number of methods. Examples include interrogation range, signal strength of response signals from wireless electronic circuits, reverse RFID (R-RFID) systems that include a grid of wireless electronic circuits, and the like. While embodiments of the present invention are not limited to these methods, each of these methods are described more fully below as examples of how proximity may be determined and used in the various embodiments.

Figure 1A:
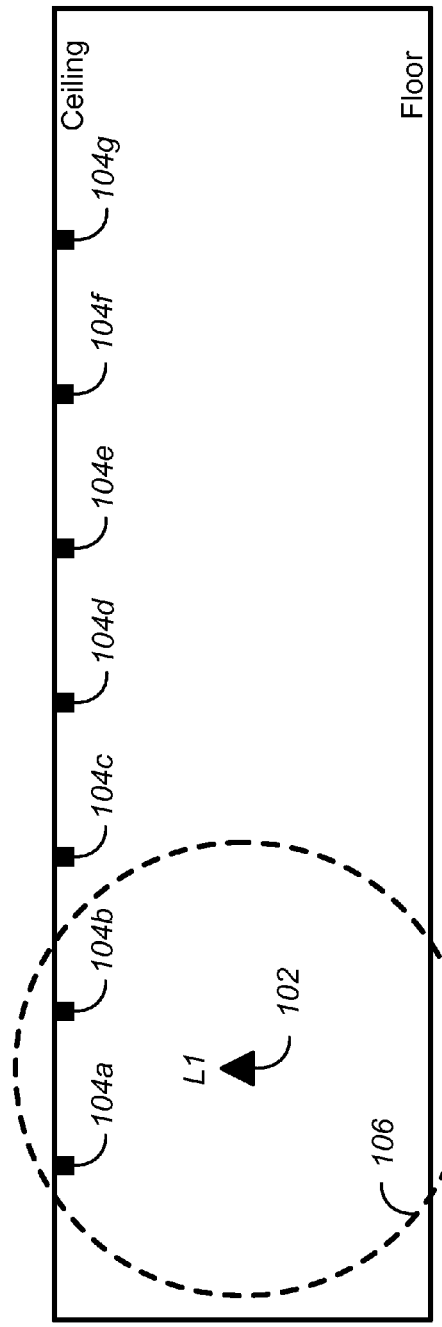
FIGS. 1A-1C and 2A-2B are simplified diagrams illustrating methods for controlling operational parameters based on proximity of a wireless reader device to wireless electronic circuits in accordance with some embodiments of the invention.
Figure 1B:
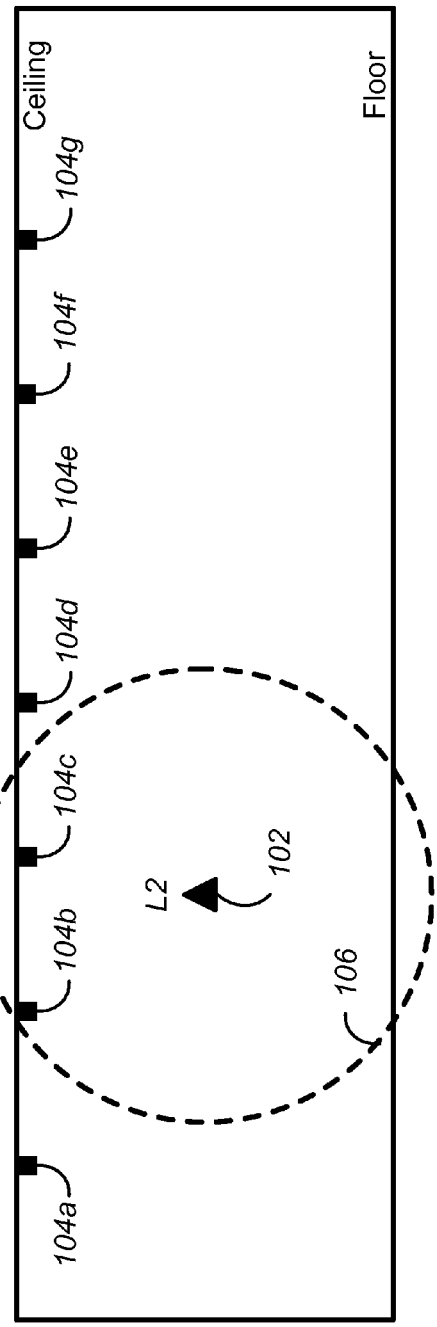
Figure 1C:
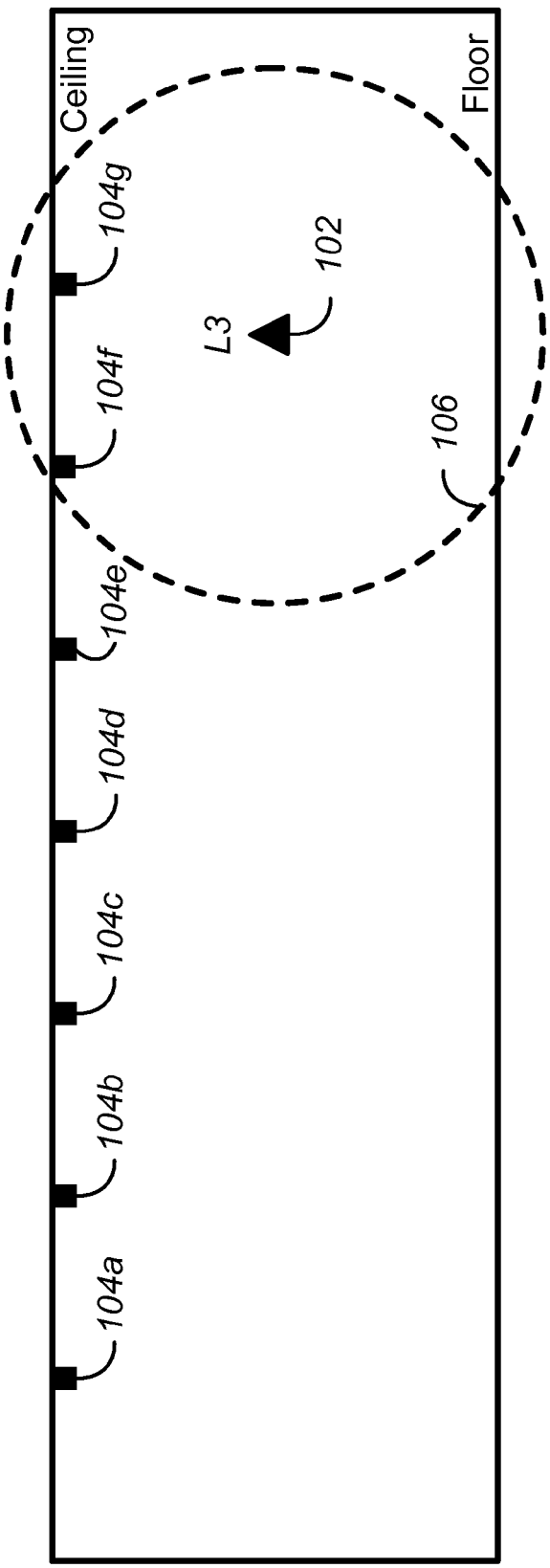

FIGS. 1A-1C are simplified diagrams illustrating methods for controlling operational parameters based on proximity of a wireless reader device to wireless electronic circuits in accordance with some embodiments of the invention. These figures show a rectangular-shaped side view of a room that may be part of a house or building. The floor is identified on the bottom and the ceiling is identified on top. Walls are included on each end. The room is used merely as an example, however, and embodiments of the present invention are not limited to any particular structure for implementation.

FIG. 1A shows a wireless reader device 102 at a first location L1 in the room, FIG. 1B shows the wireless reader device 102 at a second location L2 in the room, and FIG. 1C shows the wireless reader device 102 at a third location L3 in the room. In this example the wireless reader device 102 is mobile and may be hand-held or mounted on a cart or vehicle. These figures essentially provide snapshots of the wireless reader device 102 as it is moved throughout the room. At each of the locations L1, L2, L3, the wireless reader device 102 has a corresponding interrogation range 106 that is shown in this example as being circular shaped. The interrogation range 106 is shown as extending through the ceiling and floor, even though actual transmission through these mediums may alter (or block) the interrogation signals.

The wireless reader device 102 can communicate with those wireless electronic circuits 104 that are within the interrogation range 106. The wireless reader device 102 may utilize any type of technology, protocol, or standard to communicate with the wireless electronic circuits 104 (e.g., RFID, Bluetooth, WiFi, and the like). In this example, the wireless electronic circuits 104a-104g are mounted along the ceiling. As shown in these figures, at location L1 the wireless electronic circuits 104a, 104b are within the interrogation range 106 of the wireless reader device 102, at location L2 the wireless electronic circuits 104b, 104c are within the interrogation range 106 of the wireless reader device 102, and at location L3 the wireless electronic circuits 104f, 104g are within the interrogation range 106 of the wireless reader device 102. The wireless reader device 102 communicates by transmitting interrogation signals (e.g., radio frequency (RF) signals) either continuously or periodically, and those wireless electronic circuits 104 that are within the interrogation range 106 receive the interrogation signals and respond by transmitting response signals (e.g., RF signals) to the wireless reader device 102 either actively or passively in accordance with known techniques.

Although not specifically shown, the wireless reader device 102 may include standard electronic and communication components such an antenna, processor, memory, and power supply. While the wireless reader device 102 is not limited to any particular configuration, and any wireless reader device may be used with embodiments of the invention, in general the antenna may be used for transmitting and receiving signals, the processor may be used to control communications, the same or a different processor may be used for processing data and executing applications, the memory may be used for storing information, and the power supply may provide power to the various components. Each of these components may be configured in accordance with known techniques.

Further, the wireless electronic circuits 104 are not limited to any particular configuration, and any wireless electronic circuit may be used with embodiments of the invention. In general, the wireless electronic circuits 104 may each include at least an antenna and an integrated circuit. The antenna may be used for receiving and transmitting signals, and the integrated circuit may be used for storing and processing data, modulating and demodulating RF signals, collecting power from reader signals, and other functions. In some embodiments, one or more of the wireless electronic circuits 104 may include batteries for active or battery assisted passive operation. Each of these components may be configured in accordance with known techniques.

At the first location L1, the wireless reader device 102 sends interrogation signals that are received by the wireless electronic circuits 104a, 104b, and each of the wireless electronic circuits 104a, 104b respond by sending data to the wireless reader device 102. Although not shown in this example, in some embodiments the wireless reader device 102 may report the data that is received from the wireless electronic circuits 104a, 104b to an external device (e.g., a controller or base station). The data may be reported using a higher transmission energy that provides an extended range compared to that of the interrogation range 106.

The data received from the electronic circuits 104 is not limited and may include identifying information, position information, operational parameters, and/or the like. The data may explicitly specify the information or a control parameter may be conveyed that is associated with the information. The data (or control bits) can be stored in memory of the wireless electronic circuits in accordance with known techniques. The identifying information may include an identity of the wireless electronic circuit sending the data and/or information associated with the type of object or structure to which the wireless electronic circuit is attached. Similarly, the position information may include a position of the wireless electronic circuit sending the data and/or a position of an object or structure to which the wireless electronic circuit is attached.

In some embodiments, the identifying information and/or the position information may be used to determine the operational parameters. In other embodiments, the data from the electronic circuits 104 may specify the operational parameters (or a control parameter associated with the operational parameters). In either case, the operational parameters may be used by the wireless reader device 102 to control operations such as an interrogation rate, a reporting rate, a report type, a transmission power, an encryption level, and/or the like. In reverse RFID (R-RFID) systems (explained more fully below), the operational parameters may specify a location accuracy that is dependent on spacing of the wireless electronic circuits. Alternatively, the operational parameters may be used by one or more other devices (e.g., sensors or imaging devices) to control operations such as a sampling rate, a sample type, a reporting rate, a report type, and/or the like. In some embodiments, the operational parameters may be used by both the wireless reader device 102 and the one or more other devices to control their respective operations.

As a specific example, operational parameters from the wireless electronic circuits 104a-104b may specify an interrogation rate for the wireless reader device 102 of once per second compared to a default interrogation rate of twice per second. The wireless reader device 102 may change its interrogation rate to once per second based on the operational parameters received from the wireless electronic circuits 104a-104b.

At the second location L2, the wireless reader device 102 sends interrogation signals that are received by the wireless electronic circuits 104b, 104c, and each of the wireless electronic circuits 104b, 104c respond by sending data to the wireless reader device 102. While the data received from wireless electronic circuit 104b will likely be the same, the data from wireless electronic circuit 104c may be different from the data received from wireless electronic circuit 104a.

For example, if the data includes identifying information, the identifying information received from wireless electronic circuit 104c may be different from that received from wireless electronic circuit 104a (assuming each wireless electronic circuit has a unique identifier).

Similarly, if the data includes position information, the position information received from wireless electronic circuit 104c may be different from that received from wireless electronic circuit 104a since they are in different locations.

If the data includes operational parameters, however, the operational parameters received from the wireless electronic circuit 104c may or may not be different from those received from wireless electronic circuit 104a. If the operational parameters are the same, control of the wireless reader device 102 and/or the one or more other devices will likely remain unchanged. If the operational parameters are different, control of the wireless reader device 102 and/or the one or more other devices may be changed.

In some embodiments, even if the operational parameters are different, the wireless reader device 102 and/or the one or more other devices may choose to maintain the same control despite the different operational parameters. Alternatively, an option may be provided to a user to determine whether to accept or reject any changes.

Continuing the specific example provided above with regard to location L1, operational parameters of the wireless electronic circuit 104c may specify an interrogation rate for the wireless reader device 102 of once every two seconds, while the operational parameters of the wireless electronic circuit 104b remain unchanged and specify an interrogation rate of once per second. This provides a number of control options that may depend on the particular situation or the particular implementation. For example, the wireless reader device 102 may change its interrogation rate to once every two seconds based on the new operational parameters received from the wireless electronic circuit 104c. Alternatively, the wireless reader device 102 may change its interrogation rate to once every one and a half seconds based on an average of the operational parameters received from the wireless electronic circuits 104b, 104c. As yet another alternative, the wireless reader device 102 may leave its interrogation rate unchanged until it receives new operational parameters from multiple wireless electronic circuits. As this example illustrates, a number of rules may be implemented to determine how to respond to changes in operational parameters.

As the wireless reader device 102 is moved throughout the room, it eventually makes it to the third location L3. At the third location L3, the wireless reader device 102 sends interrogation signals that are received by the wireless electronic circuits 104f, 104g, and each of the wireless electronic circuits 104f, 104g respond by sending data to the wireless reader device 102.

Once again, if the data includes identifying information and/or position information, the data will likely be different from that received from previous wireless electronic circuits.

If the data includes operational parameters, the operational parameters may or may not be different from that received from previous wireless electronic circuits. If the operational parameters are the same, control of the wireless reader device 102 and/or the one or more other devices will likely remain unchanged. If the operational parameters are different, control of the wireless reader device 102 and/or the one or more other devices may be changed.

Continuing the specific example provided above with regard to locations L1 and L2, operational parameters of the wireless electronic circuits 104f, 104g may specify an interrogation rate for the wireless reader device 102 of twice per second. This is the same as the default interrogation rate. Assuming the wireless reader device 102 was using a different interrogation rate, it may change its interrogation rate to twice per second based on the operational parameters received from the wireless electronic circuits 104f, 104g.

As this example illustrates, operational parameters of the wireless reader device 102 and/or the one or more other devices may change as the wireless reader device 102 is moved throughout a room or any other environment that includes one or more wireless electronic circuits. The operational parameters may change based on proximity of the wireless reader device 102 to one or more of the wireless electronic circuits. Note that while proximity is determined based on interrogation range in this example, proximity may be determined in any manner including the methods that are described below.

Embodiments of the present invention can be useful in a number of different situations. For example, some wireless electronic circuits may be placed in areas that for one reason or another are of a higher risk (or higher security). The operational parameters of the wireless electronic circuits in these areas may provide an increased interrogation rate or an increased reporting rate compared to wireless electronic circuits that are in areas of a lower risk. This can increase safety in these higher risk areas. Conversely, the operational parameters of wireless electronic circuits in areas of a lower risk may provide a decreased interrogation rate, a decreased transmission power (transmission of interrogation and/or reporting signals), or a decreased reporting rate. This can preserve battery power while a wireless reader device is in these lower risk areas. Embodiments may be used in numerous other situations to provide these and other benefits.

Figure 2A:
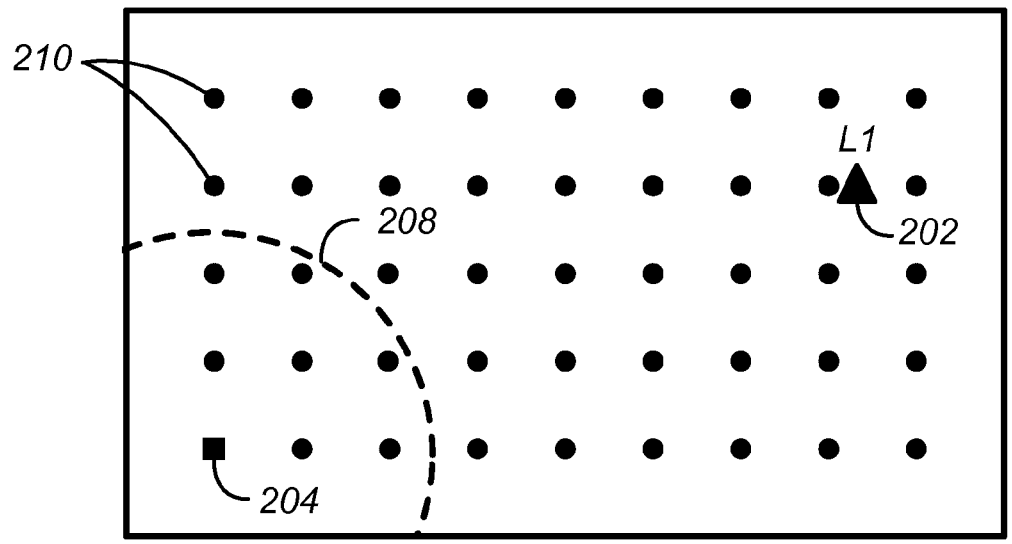
Figure 2B:
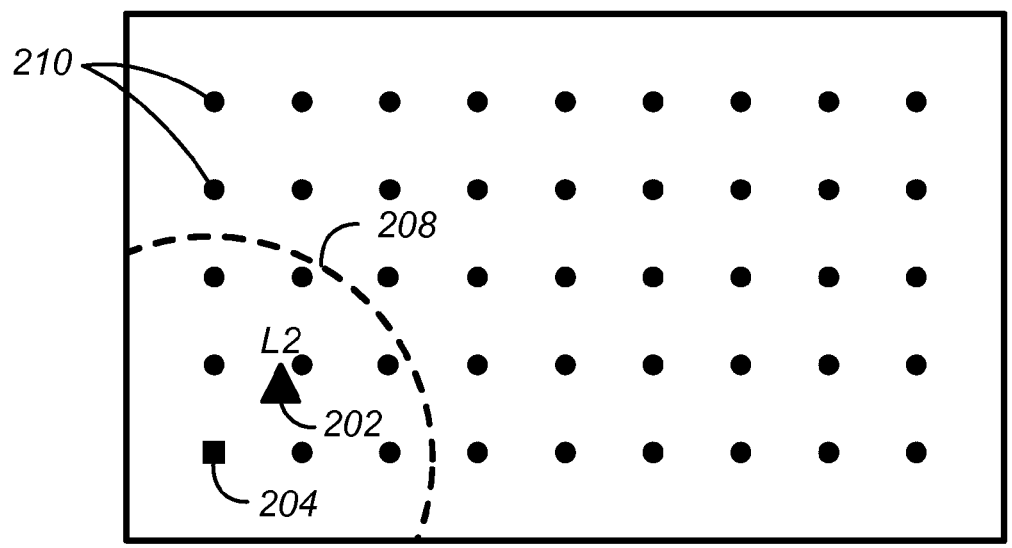

FIGS. 2A-2B are simplified diagrams illustrating methods for controlling operational parameters based on proximity of a wireless reader device to wireless electronic circuits in accordance with some embodiments of the invention. These figures show a rectangular-shaped plan view of an area that includes a grid of wireless electronic circuits. The grid includes wireless electronic circuit 204 and a number of other wireless electronic circuits 210. The wireless electronic circuit 204 is represented by a square, while each of the other wireless electronic circuits 210 are represented by a round dot.

This example also includes a proximity line 208 surrounding wireless electronic circuit 204. In FIG. 2A, a wireless reader device 202 is at a first location L1 that is outside the proximity line 208 (or on an opposite side of the proximity line 208 compared to the wireless electronic circuit 204). In FIG. 2B, the wireless reader device 202 is at a second location L2 that is inside the proximity line 208 (or on the same side of the proximity line 208 as the wireless electronic circuit 204).

The proximity line 208 represents an approximate distance from the wireless electronic circuit 204 at which operational parameters of the wireless reader device 202 and/or one or more other devices may change. For example, in FIG. 2A the wireless reader device 202 and/or the one or more other devices may operate based on a first set of operational parameters because the wireless reader device 202 is outside the proximity line 208, while in FIG. 2B the wireless reader device 202 and/or the one or more other devices may operate based on a second set of operational parameters because the wireless reader device 202 is inside the proximity line 208.

As explained above, proximity of the wireless reader device 202 to the wireless electronic circuit 204 may be determined in any manner. For example, the proximity line 208 may represent an approximate distance at which the wireless electronic circuit 204 is within an interrogation range of the wireless reader device 202. The interrogation range may depend upon a transmission power used by the wireless reader device 202, and the transmission power may be controlled based on operation parameters. Alternatively, the proximity line 208 may represent an approximate distance at which a signal strength of response signals from the wireless electronic circuit 204 are at a particular level (or a specified threshold). As yet another alternative, the proximity line 208 may be an approximate distance from the wireless electronic circuit 204 that may be determined using a process analogous to the reverse RFID (R-RFID) process described in U.S. Patent Publication No. 2011/0043373, the entire contents of which are incorporated herein by reference in their entirety.

Any of these or other methods may be used to determine proximity of the wireless reader device 202 to the wireless electronic circuit 204. Operational parameters of the wireless reader device 202 and/or one or more other devices may be controlled based on the proximity. In some embodiments, the operational parameters are included in the data that is sent from the wireless electronic circuit 204 and the other wireless electronic circuits 210 to the wireless reader device 202. Here, the wireless electronic circuit 204 may send different operational parameters than the other wireless electronic circuits 210, and control of the wireless reader device 102 and/or the one or more other devices may change when the wireless reader device 202 is inside the proximity line 208. The change may continue until new operational parameters are received, or the control may revert back when the wireless reader device 202 moves to a location outside the proximity line 208. Alternatively, the operational parameters may be determined by the wireless reader device 202 or by an external device (e.g., a controller or base station) depending on a position of the wireless reader device 202 relative to the wireless electronic circuit 204.

The embodiments illustrated in FIGS. 1A-1C and 2A-2B have been described generally with reference to a wireless reader device and wireless electronic circuits. As explained above, the wireless reader device may utilize any type of technology, protocol, or standard to communicate with the wireless electronic circuits. Various other features are illustrated in FIGS. 3-9 and described below with specific reference to an RFID reader and RFID tag circuits. These features are not limited to an RFID reader and RFID tag circuits, however, but instead apply to any type of wireless reader device and/or wireless electronic circuits. Also, while proximity is determined based on interrogation range in the description of FIGS. 3-4 and 6-9 below, these examples are not so limited, and proximity may be determined in any manner. Further, features described with reference to one figure may be combined with one or more other features described with reference to other figures. Finally, while FIGS. 3-9 show an RFID reader with a single RFID tag circuit, this is merely for ease of illustration. The various features apply equally to embodiments that include a plurality of RFID tag circuits (or wireless electronic circuits) similar to the embodiments shown in FIGS. 1-2 and described above.

Figure 3A:
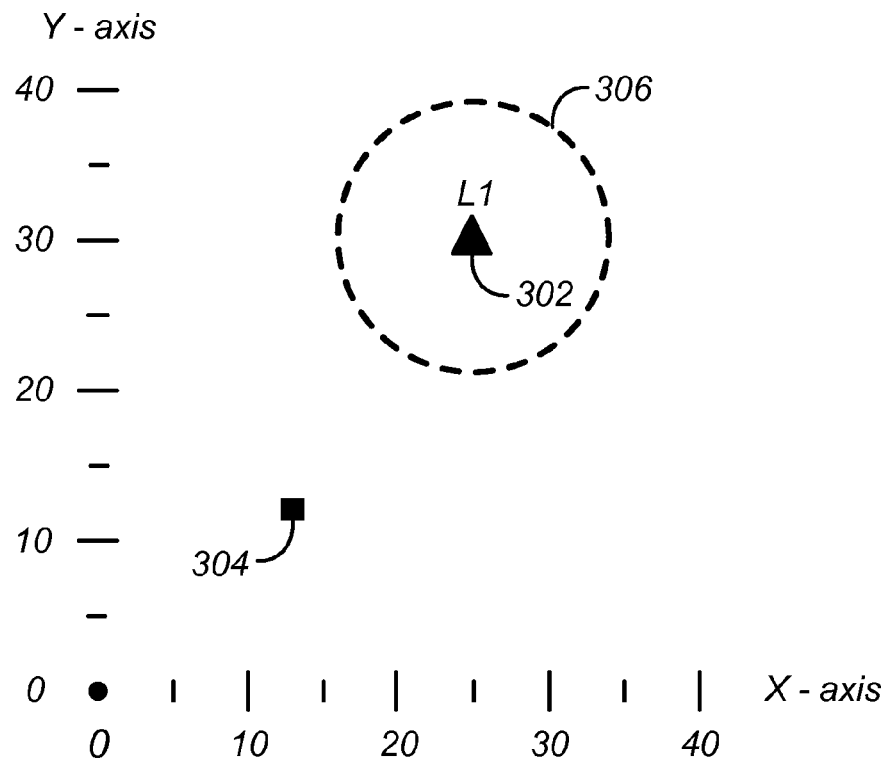
FIGS. 3A-3C and 4A-4B are simplified diagrams illustrating methods for controlling operational parameters of an RFID reader based on proximity of the RFID reader to an RFID tag circuit in accordance with some embodiments of the invention.
Figure 3B:
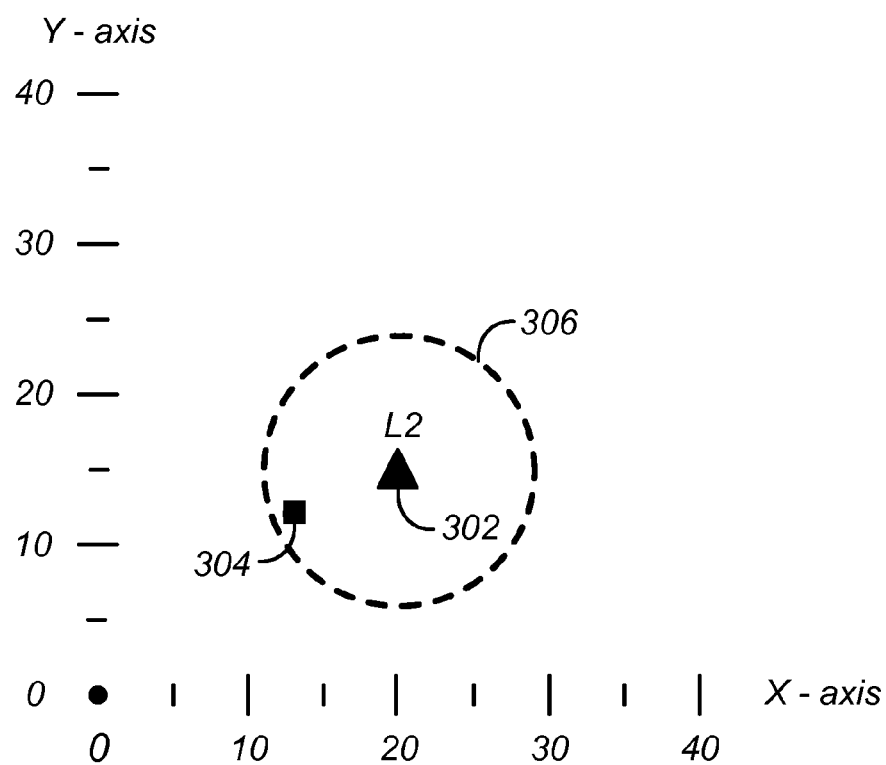
Figure 3C:
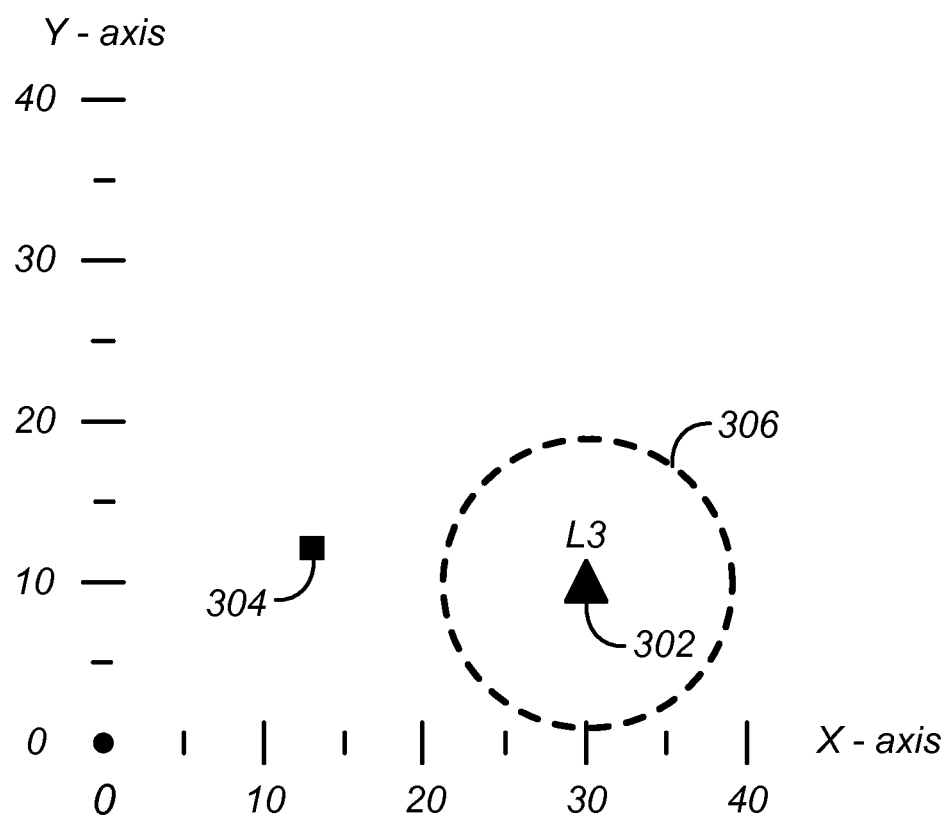

FIGS. 3A-3C are simplified diagrams illustrating a method for controlling operational parameters of an RFID reader based on proximity of the RFID reader to an RFID tag circuit in accordance with an embodiment of the invention. These figures show an RFID reader 302 with an interrogation range 306 and an RFID tag circuit 304.

In FIG. 3A, the RFID reader 302 is at a first location L1, and the RFID tag circuit 304 is outside the interrogation range 306. Here, the RFID reader 302 may operate based on a first set of operational parameters. The first set of operational parameters may be default operational parameters, or they may be based on operational parameters that are received with data from other RFID tag circuits that are not explicitly shown in this example.

In FIG. 3B, the RFID reader 302 is at a second location L2, and the RFID tag circuit 304 is within the interrogation range 306. Here, the RFID reader 302 may operate based on a second set of operational parameters that may be included with data received from the RFID tag circuit 304.

In FIG. 3C, the RFID reader 302 is at a third location L3, and the RFID tag circuit 304 is once again outside the interrogation range 306. Here, the RFID reader 302 may operate based on the second set of operational parameters that was included with the data received from the RFID tag circuit 304. Alternatively, the RFID reader 302 may revert back to the first set of operational parameters when the RFID tag circuit 304 is outside the interrogation range 306.

Figure 4A:
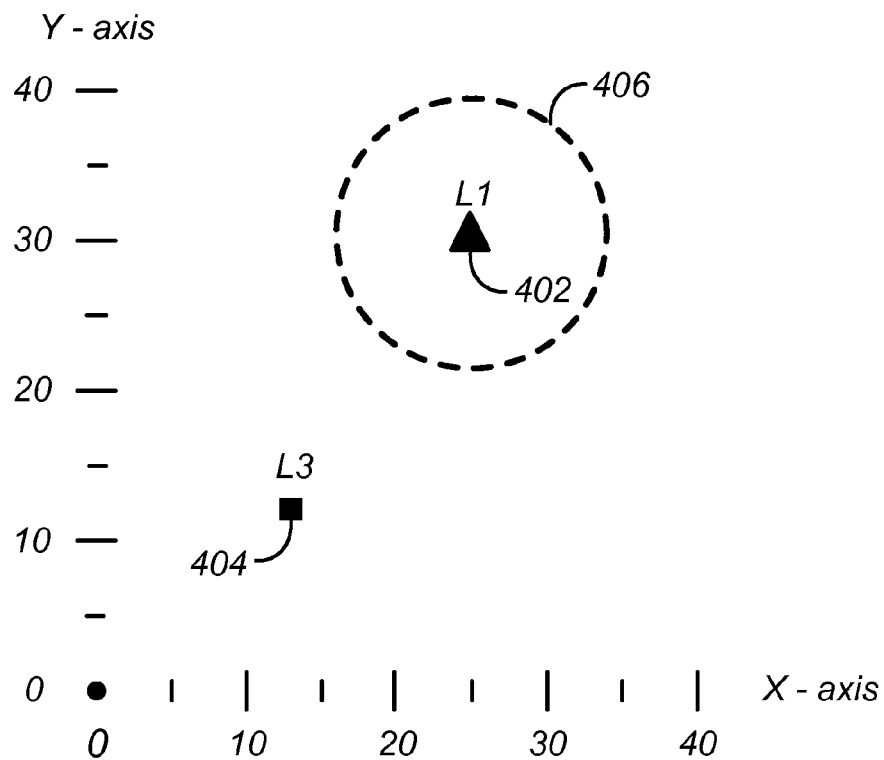
Figure 4B:
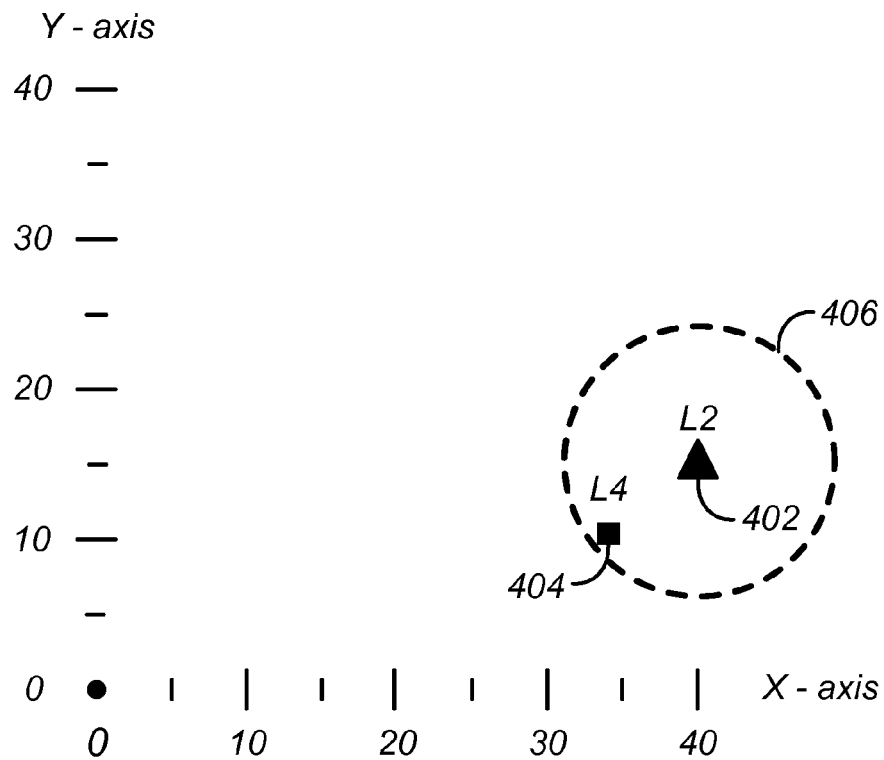

FIGS. 4A-4B are simplified diagrams illustrating a method for controlling operational parameters of an RFID reader based on proximity of the RFID reader to an RFID tag circuit in accordance with another embodiment of the invention. These figures show an RFID reader 402 with an interrogation range 406 and a mobile RFID tag circuit 404. The RFID tag circuit 404 may be mobile because it is attached to a mobile object such as a crane or an earth mover at a construction site.

In FIG. 4A, the RFID reader 402 is at a first location L1, and the RFID tag circuit 404 is at a third location L3 outside the interrogation range 406. Here, the RFID reader 402 may operate based on a first set of operational parameters. The first set of operational parameters may be default operational parameters, or they may be based on operational parameters that are received with data from other RFID tag circuits that are not explicitly shown in this example.

In FIG. 4B, the RFID reader 402 is at a second location L2, and the RFID tag circuit 404 is at a fourth location L4 that is within the interrogation range 406. In this example, both the RFID reader 402 and the RFID tag circuit 404 have changed locations between FIG. 4A and FIG. 4B. Because the RFID tag circuit 404 is within the interrogation range 406 in FIG. 4B, the RFID reader 402 may operate based on a second set of operational parameters that may be included with the data received from the RFID tag circuit 404.

Figure 5A:
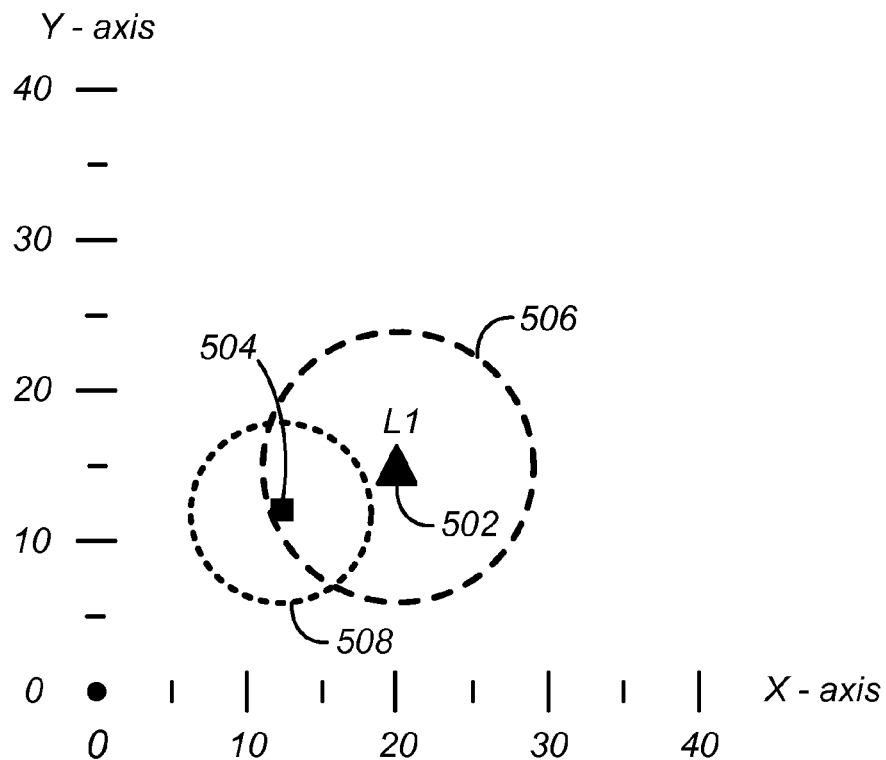
FIGS. 5A-5B are simplified diagrams illustrating a method for controlling operational parameters of an RFID reader based on a signal strength of a response signal from an RFID tag circuit in accordance with an embodiment of the invention.
Figure 5B:
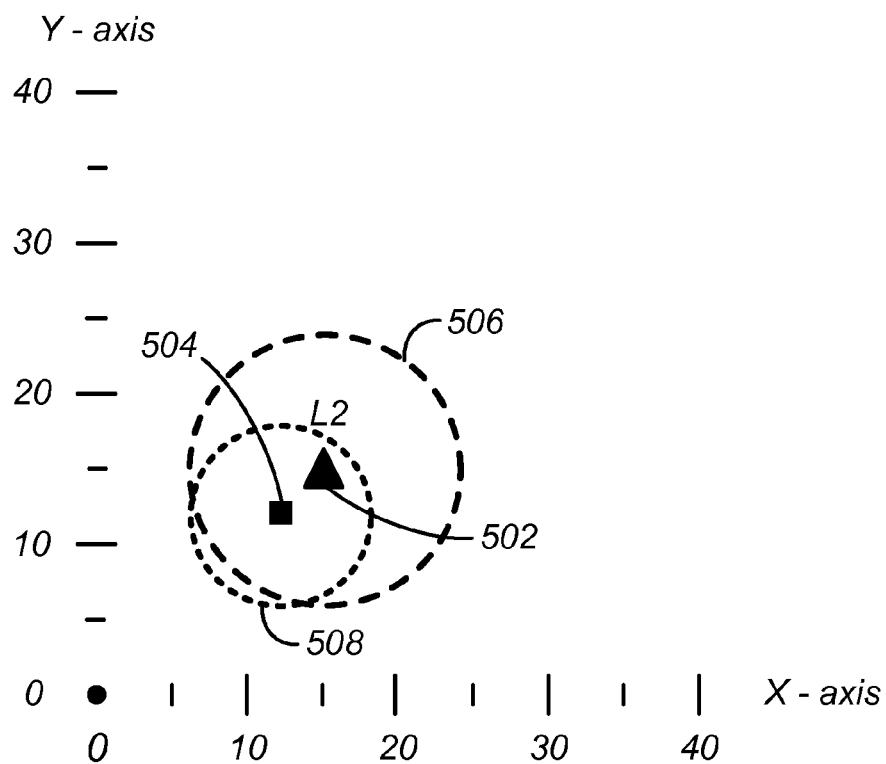

FIGS. 5A-5B are simplified diagrams illustrating a method for controlling operational parameters of an RFID reader based on a signal strength of a response signal from an RFID tag circuit in accordance with an embodiment of the invention. These figures show an RFID reader 502 with an interrogation range 506 and an RFID tag circuit 504. These figures also show a proximity line 508 surrounding the RFID tag circuit 504.

In FIG. 5A, the RFID reader 502 is at a first location L1 and the RFID tag circuit 504 is inside the interrogation range 506. The RFID reader 502, however, is outside the proximity line 508. The proximity line 508 may represent an approximate distance at which a signal strength of response signals transmitted from the RFID tag circuit 504 are at a threshold signal level. The RFID reader 502 may determine signal strength based on a receive signal strength indication (RSSI), a rate of change of signal strength, or any other technique. Inside the proximity line 508 the signal strength is greater than the threshold signal level, and outside the proximity line 508 the signal strength is less than the threshold signal level.

In FIG. 5A, the RFID tag circuit 504 is within the interrogation range 506, and the RFID reader 502 may receive a second set of operational parameters with data sent from the RFID tag circuit 504. Although the RFID tag circuit 504 is within the interrogation range 506, however, the signal strength of response signals transmitted from the RFID tag circuit 504 is less than the threshold signal level. Consequently, the RFID reader 502 may operate based on a first set of operational parameters. The first set of operational parameters may be the same operational parameters that the RFID reader 502 used before receiving the second set of operational parameters from the RFID tag circuit 504. The first set of operational parameters may be default operational parameters, or they may be operational parameters that are received with data from other RFID tag circuits that are not explicitly shown in this example.

In FIG. 5B, the RFID reader 502 is at a second location L2 and the RFID tag circuit 504 is still within the interrogation range 506. Now, however, the RFID reader 502 is inside the proximity line 508. Because the RFID reader 502 is within the proximity line 508, the signal strength of response signals transmitted from the RFID tag circuit 504 is greater than the threshold signal level. Because the signal strength is greater than the threshold signal level, the RFID reader 502 may operate based on the second set of operational parameters that are included with the data received from the RFID tag circuit 504.

Figure 6A:
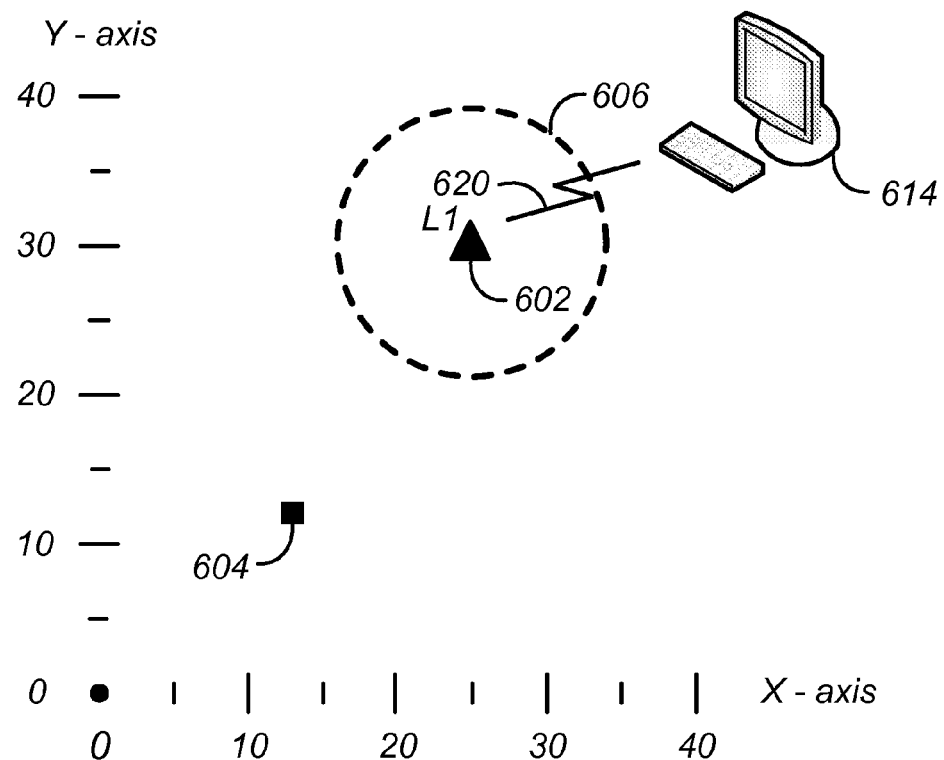
FIGS. 6A-6B are simplified diagrams illustrating a method for controlling reporting signals from an RFID reader based on proximity of the RFID reader to an RFID tag circuit in accordance with an embodiment of the invention.
Figure 6B:
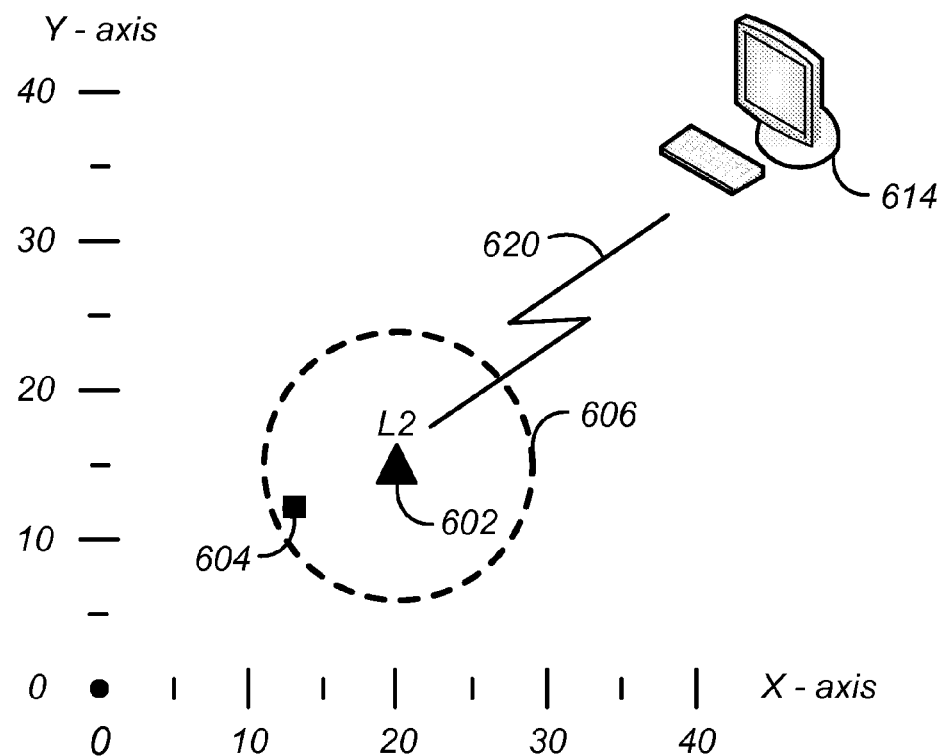

FIGS. 6A-6B are simplified diagrams illustrating a method for controlling reporting signals from an RFID reader based on proximity of the RFID reader to an RFID tag circuit in accordance with an embodiment of the invention. These figures show an RFID reader 602 with an interrogation range 606 and an RFID tag circuit 604. These figures also show a controller (or base station) 614 that communicates with the RFID reader 602 via signals 620.

In FIG. 6A, the RFID reader 602 is at a first location L1, and the RFID tag circuit 604 is outside the interrogation range 606. Here, the RFID reader 602 may transmit reporting signals (signals 620) to the controller 614 based on a first set of operational parameters. The first set of operational parameters may be default operational parameters, or they may be operational parameters that are received with data from other RFID tag circuits that are not explicitly shown in this example.

In FIG. 6B, the RFID reader 602 is at a second location L2, and the RFID tag circuit 604 is within the interrogation range 606. Here, the RFID reader 602 may transmit reporting signals (signals 620) to the controller 614 based on a second set of operational parameters that may be included with data received from the RFID tag circuit 604.

While not being limited to any particular configuration, the controller 614 may be part of a system that receives data from one or more mobile RFID readers. The data may be the same data that the RFID readers receive from the RFID tag circuits. Alternatively, the data may be a subset or a summary of the data that the RFID readers receive from the RFID tag circuits. The controller 614 may analyze the data and make control decisions. For example, the data may include position information from the RFID tag circuits, and based on this position information, the controller 614 may send new or different operational parameters to the RFID readers via the signals 620. In this manner, the operational parameters of the RFID readers may be controlled by the controller 614. In other embodiments, the controller 614 may send new or different operational parameters to other devices (e.g., sensors or imaging devices) based on the data from the RFID readers.

Figure 7A:
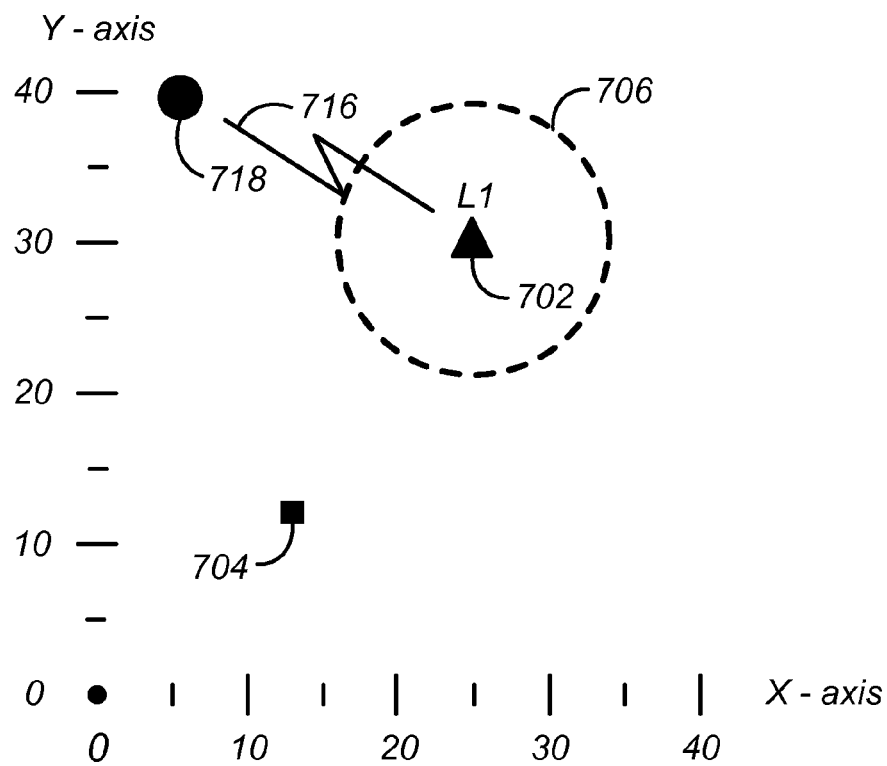
FIGS. 7A-7B and 8A-8B are simplified diagrams illustrating methods for controlling operational parameters of a sensor based on proximity of an RFID reader to an RFID tag circuit in accordance with some embodiments of the invention.
Figure 7B:
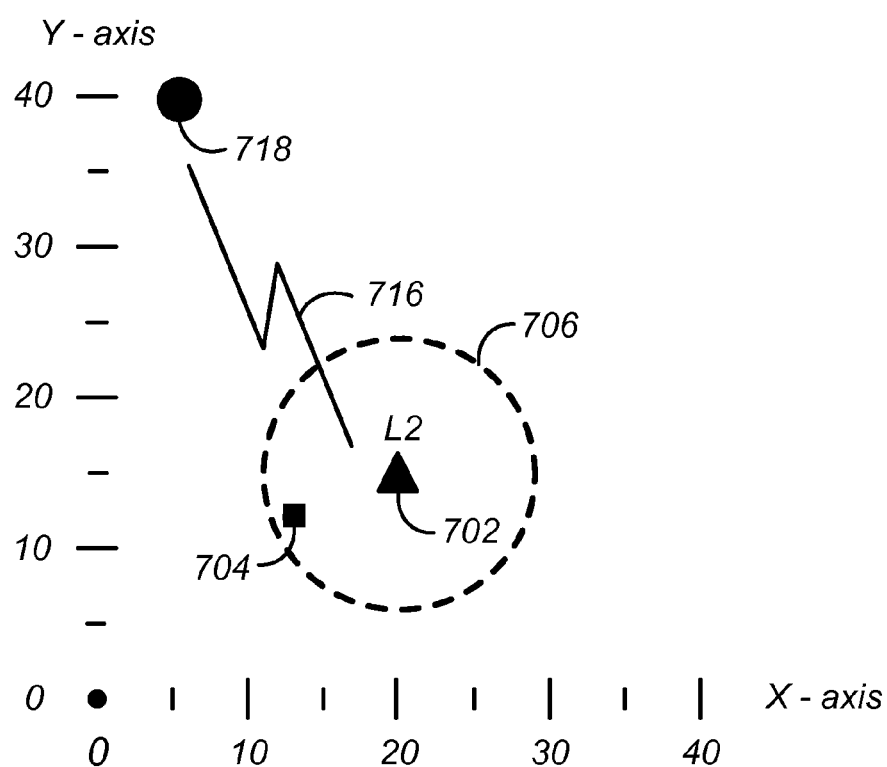

FIGS. 7A-7B are simplified diagrams illustrating methods for controlling operational parameters of a sensor based on proximity of an RFID reader to an RFID tag circuit in accordance with an embodiment of the invention. These figures show an RFID reader 702 with an interrogation range 706 and an RFID tag circuit 704. These figures also show a sensor 718 that can communicate with the RFID reader 702 via signals 716.

The type of sensor used with embodiments of the invention is not limited and may be configured to provide any number of data collection or analysis functions. For example, the sensor may monitor environmental conditions such as temperature or pressure. Similarly, the sensor may be configured to analyze a sample (e.g., a gas sample). As another example, the sensor may include an imaging device configured to acquire image data. Further, the RFID reader 702 may be configured to communicate with the sensor via a wireless interface circuit (e.g., an RFID tag circuit) in accordance with known techniques.

In FIG. 7A, the RFID reader 702 is at a first location L1, and the RFID tag circuit 704 is outside the interrogation range 706. Here, the sensor 718 may operate based on a first set of operational parameters. The first set of operational parameters may be default operational parameters, or they may be operational parameters that are received with data from other RFID tag circuits that are not explicitly shown in this example. The operational parameters may be used to control a number of different operations performed by the sensor 718, including a sampling rate, a sample type, a reporting rate, a report type, and/or the like In FIG. 7B, the RFID reader 702 is at a second location L2, and the RFID tag circuit 704 is within the interrogation range 706. Here, the sensor 718 may operate based on a second set of operational parameters that may be included with data received from the RFID tag circuit 704 and transmitted from the RFID reader 702 to the sensor 718 via the signals 716. The first and second set of operational parameters may be used to effect any sensor capability or mode of operation such as collecting or analyzing.

While these figures show the sensor 718 as being separate from the RFID reader 702, in some embodiments the sensor 718 may be integrated with the RFID reader 702 in a single device (e.g., a hand-held unit). Such an integrated device may be configured for direct communications between those components performing the RFID reader functions and those components performing the sensor functions so that communications via the signals 716 are not required. The other features described with reference to FIGS. 7A-7B can be applied whether the RFID reader 702 and the sensor 718 are separate or integrated.

Figure 8A:
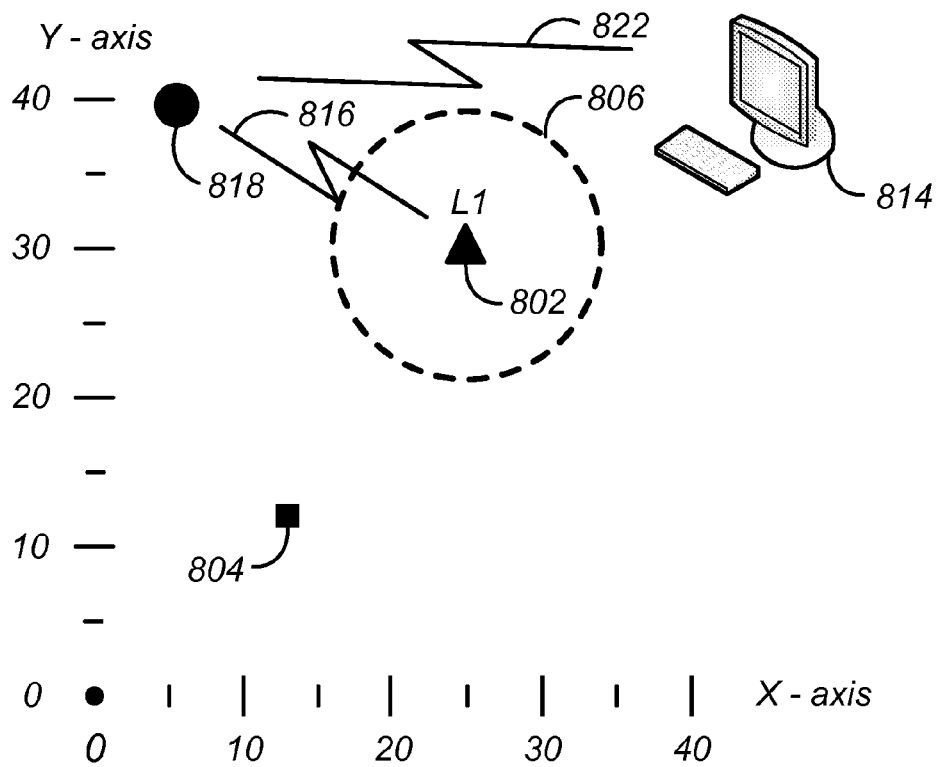
Figure 8B:
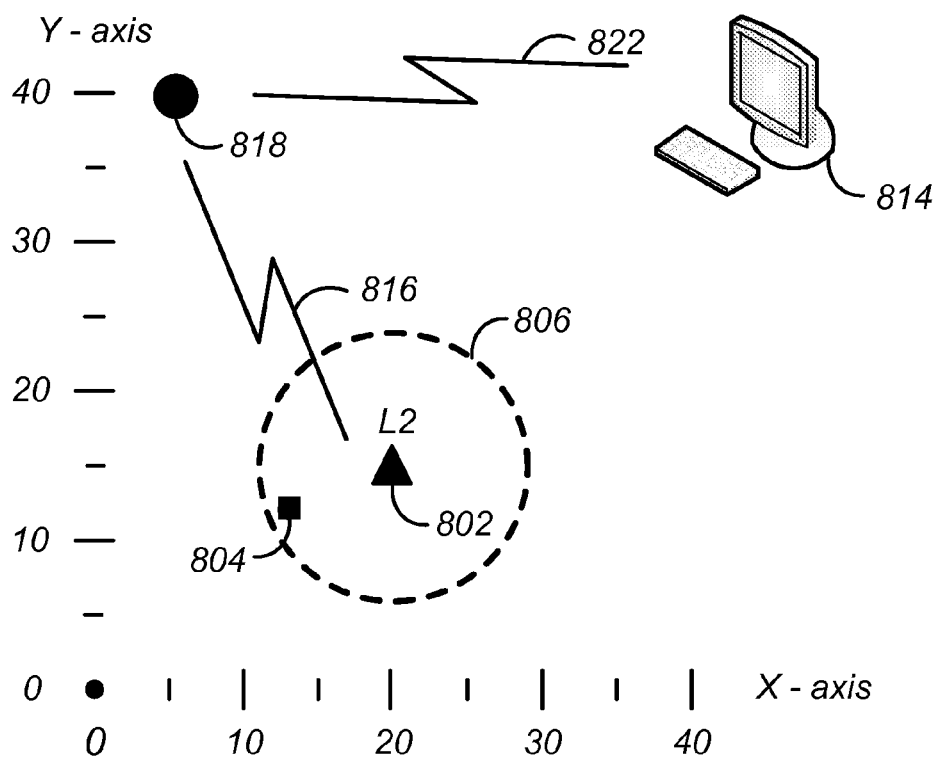

FIGS. 8A-8B are simplified diagrams illustrating methods for controlling operational parameters of a sensor based on proximity of an RFID reader to an RFID tag circuit in accordance with another embodiment of the invention. These figures show an RFID reader 802 with an interrogation range 806 and an RFID tag circuit 804. These figures also show a sensor 818 that communicates with the RFID reader 802 via signals 816 and communicates with a controller (or base station) 814 via signals 822. The sensor 818 may be similar to the sensor 718 described above with regard to FIGS. 7A-B, and the controller 814 may be similar to the controller 614 described above with regard to FIGS. 6A-6B.

In FIG. 8A, the RFID reader 802 is at a first location L1, and the RFID tag circuit 804 is outside the interrogation range 806. Here, the sensor 818 may operate based on a first set of operational parameters. The first set of operational parameters may be default operational parameters, or they may be operational parameters that are received with data from other RFID tag circuits that are not explicitly shown in this example.

In FIG. 8B, the RFID reader 802 is at a second location L2, and the RFID tag circuit 804 is within the interrogation range 806. Here, the sensor 818 may operate based on a second set of operational parameters that may be included with data received from the RFID tag circuit 804 and transmitted from the RFID reader 802 to the sensor 818 via the signals 816. The second set of operational parameters may also determine a reporting rate or report type that is sent from the sensor 818 to the controller 814 via signals 822.

Figure 9:
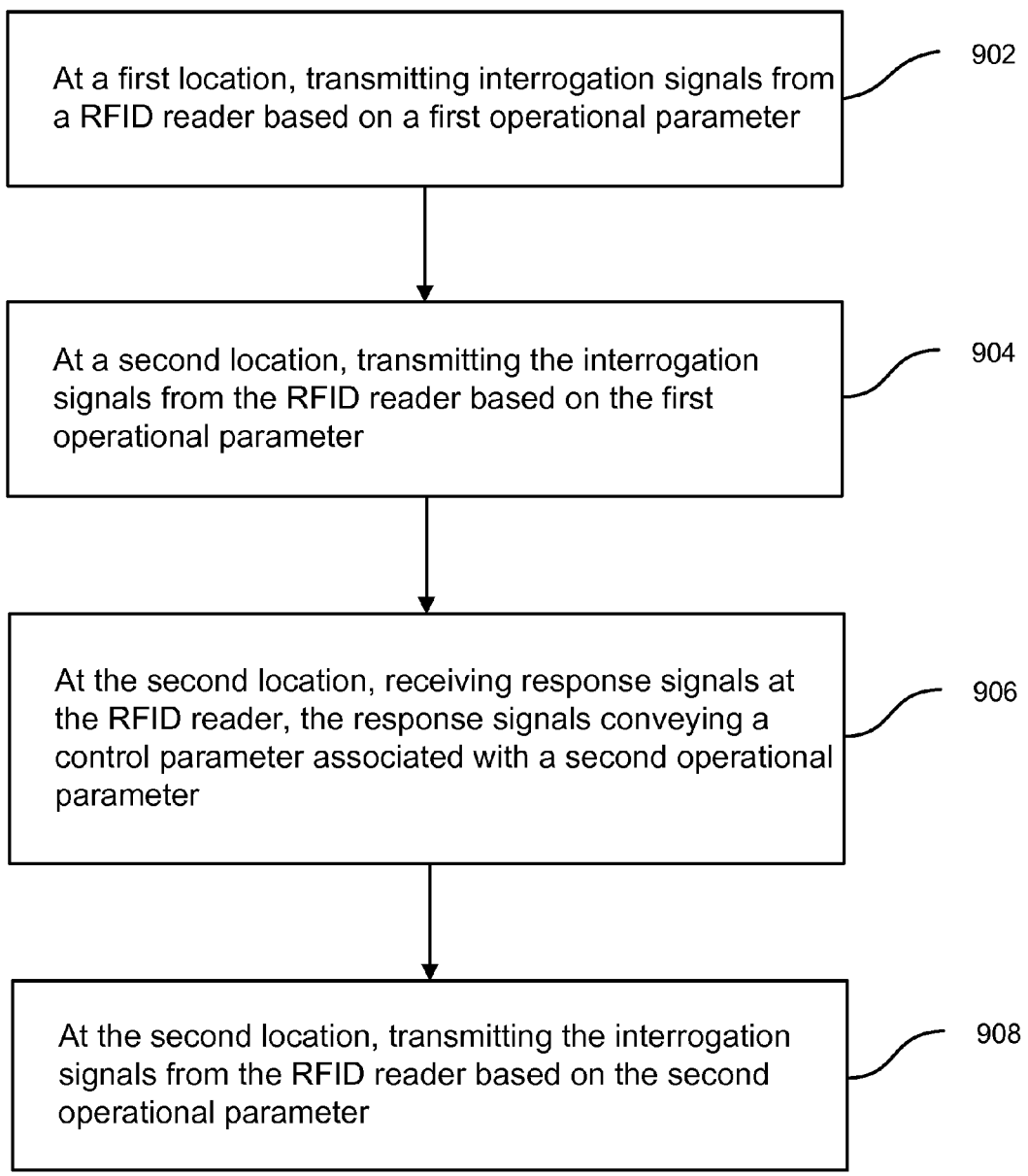
FIG. 9 is a flowchart illustrating a method for controlling interrogation signals from an RFID reader based on proximity of the RFID reader to an RFID tag circuit in accordance with an embodiment of the invention.

FIG. 9 is a flowchart illustrating a method for controlling interrogation signals from an RFID reader based on proximity of the RFID reader to an RFID tag circuit in accordance with an embodiment of the invention. At a first location, interrogation signals are transmitted from an RFID reader based on a first operational parameter (902). The RFID reader may receive response signals from one or more RFID tag circuits while at the first location, but based on proximity to the one or more RFID tag circuits, the RFID reader does not make any changes to its operational parameters while at the first location.

At a second location, interrogation signals are transmitted from the RFID reader based on the first operational parameter (904). This is similar to step (902) performed at the first location. Also at the second location, response signals are received at the RFID reader that convey a control parameter associated with a second operational parameter (906). The response signals are received from one or more RFID tag circuits. Also at the second location, interrogation signals are transmitted from the RFID reader based on the second operational parameter (904). The operational parameters are changed based on proximity of the RFID reader to one or more RFID tag circuits.

It should be appreciated that the specific steps illustrated in FIG. 9 provide a particular method for controlling operational parameters of an RFID reader based on proximity of the RFID reader to an RFID tag circuit in accordance with an embodiment of the present invention. Other sequences of steps may also be performed according to alternative embodiments. For example, alternative embodiments may perform the steps outlined above in a different order. Moreover, the individual steps illustrated in FIG. 9 may include multiple sub-steps that may be performed in various sequences. Furthermore, additional steps may be added or removed depending on the particular application.

Some embodiments of the present invention may be implemented by hardware, software, firmware, virtual machine, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description but with reference to the appended claims along with their full scope of equivalents.

What is claimed is:

1. A method for controlling an interrogation rate of a radio-frequency identification (RFID) reader based on proximity of the RFID reader to an RFID tag circuit, the method comprising:

moving the RFID reader from a first location to a second location, wherein at the first location the RFID tag circuit is outside an interrogation range of the RFID reader, and at the second location the RFID tag circuit is within the interrogation range of the RFID reader;
at the first location:
transmitting interrogation signals from the RFID reader at a first interrogation rate;
at the second location:
transmitting the interrogation signals from the RFID reader at the first interrogation rate;
receiving response signals at the RFID reader, the response signals transmitted from the RFID tag circuit in response to receiving the interrogation signals from the RFID reader, the response signals conveying a control parameter to the RFID reader that indicates to the RFID reader to transmit the interrogation signals at a second interrogation rate different from the first interrogation rate; and thereafter
transmitting the interrogation signals from the RFID reader at the second interrogation rate.

2. The method of claim 1 further comprising:
moving the RFID reader from the second location to a third location, wherein at the third location the RFID tag circuit is outside the interrogation range of the RFID reader; and
at the third location:
transmitting the interrogation signals from the RFID reader at the first interrogation rate.

3. The method of claim 1 further comprising:
moving the RFID reader from the second location to a third location, wherein at the third location the RFID tag circuit is outside the interrogation range of the RFID reader; and
at the third location:
transmitting the interrogation signals from the RFID reader at the second interrogation rate.

4. The method of claim 1 wherein the first interrogation rate is slower than the second interrogation rate.

5. The method of claim 1 wherein the first interrogation rate is faster than the second interrogation rate.

6. The method of claim 1 wherein the control parameter conveyed to the RFID reader indicates to the RFID reader that the RFID tag circuit is coupled to a stationary structure.

7. The method of claim 1 wherein the control parameter conveyed to the RFID reader indicates to the RFID reader that the RFID tag circuit is coupled to a mobile object, and while the RFID reader moves from the first location to the second location, the mobile object moves from a third location to a fourth location.

8. A method for controlling operational parameters of a radio-frequency identification (RFID) reader based on proximity of the RFID reader to an RFID tag circuit, the RFID reader being at a first proximity to the RFID tag circuit while at a first location and at a second proximity to the RFID tag circuit while at a second location, the method comprising:
at the first location:
transmitting interrogation signals from the RFID reader based on a first operational parameter;
at the second location:
transmitting the interrogation signals from the RFID reader based on the first operational parameter;
receiving response signals at the RFID reader, the response signals transmitted from the RFID tag circuit in response to receiving the interrogation signals from the RFID reader, the response signals conveying a control parameter to the RFID reader, the control parameter associated with a second operational parameter different from the first operational parameter; and thereafter
transmitting the interrogation signals from the RFID reader based on the second operational parameter.

9. The method of claim 8 wherein at the first location the RFID tag circuit is outside an interrogation range of the RFID reader, and at the second location the RFID tag circuit is within the interrogation range of the RFID reader.

10. The method of claim 8 wherein the RFID tag circuit is within an interrogation range of the RFID reader at the first location and at the second location, the method further comprising:
at the first location:
receiving the response signals at the RFID reader, the response signals transmitted from the RFID tag circuit in response to receiving the interrogation signals from the RFID reader, the response signals conveying the control parameter associated with the second operational parameter;
determining that a signal strength of the response signals is less than a threshold signal level; and thereafter
continuing to transmit the interrogation signals from the RFID reader based on the first operational parameter;
at the second location:
determining that the signal strength of the response signals is greater than a threshold signal level; and thereafter
transmitting the interrogation signals from the RFID reader based on the second operational parameter.

11. The method of claim 8 wherein the first operational parameter is associated with a first interrogation rate of the RFID reader, and the second operational parameter is associated with a second interrogation rate of the RFID reader, the first interrogation rate being different from the second interrogation rate.

12. The method of claim 8 wherein the first operational parameter is associated with a first transmission power of the RFID reader, and the second operational parameter is associated with a second transmission power of the RFID reader, the first transmission power being different from the second transmission power.

13. The method of claim 8 further comprising:
at the first location:
transmitting reporting signals from the RFID reader to a controller based on the first operational parameter;
at the second location:
while transmitting the interrogation signals from the RFID reader based on the first operational parameter, transmitting the reporting signals from the RFID reader to the controller based on the first operational parameter; and
while transmitting the interrogation signals from the RFID reader based on the second operational parameter, transmitting the reporting signals from the RFID reader to the controller based on the second operational parameter.

14. The method of claim 8 wherein the control parameter includes location information associated with a location of the RFID tag circuit, and the second operational parameter is based on the location information.

15. The method of claim 8 further comprising:
at the second location:
transmitting control signals from the RFID reader to a controller, the control signals conveying the control parameter to the controller; and
receiving signals at the RFID reader from the controller, the signals transmitted from the controller in response to receiving the control signals from the RFID reader, the signals conveying the second operational parameter to the RFID reader.

16. The method of claim 15 wherein the control parameter includes location information associated with a location of the RFID tag circuit, and the second operational parameter is based on the location information.

17. The method of claim 15 wherein the control parameter includes location information associated with a location of the RFID reader, and the second operational parameter is based on the location information.

18. A method for controlling operational parameters of a radio-frequency identification (RFID) reader based on proximity of the RFID reader to an RFID tag circuit, the RFID reader being at a first proximity to the RFID tag circuit while at a first location and at a second proximity to the RFID tag circuit while at a second location, the method comprising:
at the first location:
transmitting interrogation signals from the RFID reader; and
transmitting reporting signals from the RFID reader to a controller based on a first operational parameter;
at the second location:
transmitting the interrogation signals from the RFID reader;
transmitting the reporting signals from the RFID reader to the controller based on the first operational parameter;
receiving response signals at the RFID reader, the response signals transmitted from the RFID tag circuit in response to receiving the interrogation signals from the RFID reader, the response signals conveying a control parameter to the RFID reader, the control parameter associated with a second operational parameter different from the first operational parameter; and thereafter
transmitting the reporting signals from the RFID reader to the controller based on the second operational parameter.

19. The method of claim 18 wherein the reporting signals convey location information associated with a location of the RFID reader.

20. The method of claim 18 wherein at the first location the RFID tag circuit is outside an interrogation range of the RFID reader, and at the second location the RFID tag circuit is within the interrogation range of the RFID reader.

21. The method of claim 18 wherein the RFID tag circuit is within an interrogation range of the RFID reader at the first location and at the second location, the method further comprising:
at the first location:
receiving the response signals at the RFID reader, the response signals transmitted from the RFID tag circuit in response to receiving the interrogation signals from the RFID reader, the response signals conveying the control parameter associated with the second operational parameter;
determining that a signal strength of the response signals is less than a threshold signal level; and thereafter
continuing to transmit the reporting signals from the RFID reader to the controller based on the first operational parameter;
at the second location:
determining that the signal strength of the response signals is greater than a threshold signal level; and thereafter
transmitting the reporting signals from the RFID reader to the controller based on the second operational parameter.

22. The method of claim 18 wherein the first operational parameter is associated with a first reporting rate of the RFID reader, and the second operational parameter is associated with a second reporting rate of the RFID reader, the first reporting rate being different from the second reporting rate.

23. The method of claim 18 wherein the first operational parameter is associated with a first encryption level for the reporting signals transmitted from the RFID reader, and the second operational parameter is associated with a second encryption level for the reporting signals transmitted from the RFID reader, the first encryption level being different from the second encryption level.

24. The method of claim 18 further comprising:
at the first location:
transmitting the interrogation signals from the RFID reader based on the first operational parameter;
at the second location:
while transmitting the reporting signals from the RFID reader to the controller based on the first operational parameter, transmitting the interrogation signals from the RFID reader based on the first operational parameter; and
while transmitting the reporting signals from the RFID reader to the controller based on the second operational parameter, transmitting the interrogation signals from the RFID reader based on the second operational parameter.

25. The method of claim 18 wherein the control parameter includes location information associated with a location of the RFID tag circuit, and the second operational parameter is based on the location information.

26. The method of claim 18 further comprising:
at the second location:
transmitting control signals from the RFID reader to the controller, the control signals conveying the control parameter to the controller; and
receiving signals at the RFID reader from the controller, the signals transmitted from the controller in response to receiving the control signals from the RFID reader, the signals conveying the second operational parameter to the RFID reader.

27. The method of claim 26 wherein the control parameter includes location information associated with a location of the RFID tag circuit, and the second operational parameter is based on the location information.

28. The method of claim 26 wherein the control parameter includes location information associated with a location of the RFID reader, and the second operational parameter is based on the location information.

29. A method for controlling operational parameters of a sensor based on proximity of a radio-frequency identification (RFID) reader to an RFID tag circuit, the RFID reader being at a first proximity to the RFID tag circuit while at a first location and at a second proximity to the RFID tag circuit while at a second location, the method comprising:
at the first location:
transmitting interrogation signals from the RFID reader; and
controlling the sensor based on a first operational parameter;
at the second location:
transmitting the interrogation signals from the RFID reader;

controlling the sensor based on the first operational parameter;

receiving response signals at the RFID reader, the response signals transmitted from the RFID tag circuit in response to receiving the interrogation signals from the RFID reader, the response signals conveying a control parameter to the RFID reader, the control parameter associated with a second operational parameter different from the first operational parameter; and thereafter controlling the sensor based on the second operational parameter.

30. The method of claim 29 wherein controlling the sensor includes effecting any sensor capability or mode of operation.

31. The method of claim 29 wherein controlling the sensor includes reporting an analysis performed by the sensor to a controller, and the first operational parameter and the second operational parameter determine rates at which the sensor is controlled.

32. The method of claim 29 wherein the sensor comprises an imaging device, and controlling the sensor includes capturing image data using the imaging device, the first operational parameter and the second operational parameter determining rates at which the imaging device is controlled.

33. The method of claim 29 wherein the sensor is integrated with the RFID reader in a single handheld unit.

34. The method of claim 29 wherein the sensor is located remote from the RFID reader, the method further comprising:

transmitting control signals from the RFID reader to the sensor, the control signals conveying the control parameter to the sensor.

35. The method of claim 34 wherein the sensor includes an RFID tag circuit configured as a wireless interface to receive the signals transmitted from the RFID reader.

* * * * *